(12) United States Patent
Jenkins et al.

(10) Patent No.: US 9,779,541 B2
(45) Date of Patent: Oct. 3, 2017

(54) VIRTUAL OBJECT DISCRIMINATION FOR FAST GLOBAL ILLUMINATION RENDERING

(71) Applicant: Disney Enterprises, Inc., Burbank, CA (US)

(72) Inventors: Sean Jenkins, Sherman Oaks, CA (US); Christian Eisenacher, Burbank, CA (US); Brent Burley, Monterey Park, CA (US); Abraham Tseng, Burbank, CA (US); Dexter Cheng, Monterey Park, CA (US)

(73) Assignee: Disney Enterprises, Inc., Burbank, CA (US)

( * ) Notice: Subject to any disclaimer, the term of this patent is extended or adjusted under 35 U.S.C. 154(b) by 202 days.

(21) Appl. No.: 14/812,101

(22) Filed: Jul. 29, 2015

(65) Prior Publication Data
US 2016/0343162 A1    Nov. 24, 2016

Related U.S. Application Data

(60) Provisional application No. 62/165,829, filed on May 22, 2015.

(51) Int. Cl.
    *G06T 15/00*    (2011.01)
    *G06T 15/50*    (2011.01)
    *G06T 15/60*    (2006.01)

(52) U.S. Cl.
    CPC ............ *G06T 15/506* (2013.01); *G06T 15/00* (2013.01); *G06T 15/50* (2013.01); *G06T 15/60* (2013.01)

(58) Field of Classification Search
    CPC ...... G06T 15/506; G06T 15/405; G06T 15/30
    See application file for complete search history.

(56) References Cited

U.S. PATENT DOCUMENTS

7,362,327 B2 *  4/2008  Katsuyama ........... G06T 15/405
                                                    345/419
7,864,176 B2 *  1/2011  Planck .................. G06T 15/506
                                                    345/424

(Continued)

OTHER PUBLICATIONS

"A Characterization of Ten Hidden-Surface Algorithms" by Ivan E. Sutherland et al., vol. 6, No. 1, Mar. 1974, pp. 1-55.

(Continued)

*Primary Examiner* — Utpal Shah
(74) *Attorney, Agent, or Firm* — Farjami & Farjami LLP

(57) ABSTRACT

There is provided a system including a hardware processor, a memory, and an illumination rendering unit including a virtual object discrimination module stored in the memory. The hardware processor is configured to execute the illumination rendering unit to perform a first, primitive render of an illumination of a scene including multiple virtual objects, and to determine a score for each of the virtual objects corresponding to its respective contribution to the illumination of the scene. The hardware processor is also configured to execute the illumination rendering unit to identify one or more of the virtual objects as disregardable based on their respective scores, and to perform a second render of the illumination of the scene while disregarding presence of the identified one or more virtual objects as disregardable in the scene.

12 Claims, 5 Drawing Sheets

(56) References Cited

U.S. PATENT DOCUMENTS

2004/0125103 A1* 7/2004 Kaufman ................ G06T 15/06
 345/419
2015/0325040 A1* 11/2015 Stirbu ..................... G06T 15/40
 345/421

OTHER PUBLICATIONS

"Effective Occlusion Culling for the Interactive Display of Arbitrary Models", by Hansoug Zhang, 1998, pp. 1-109.

* cited by examiner

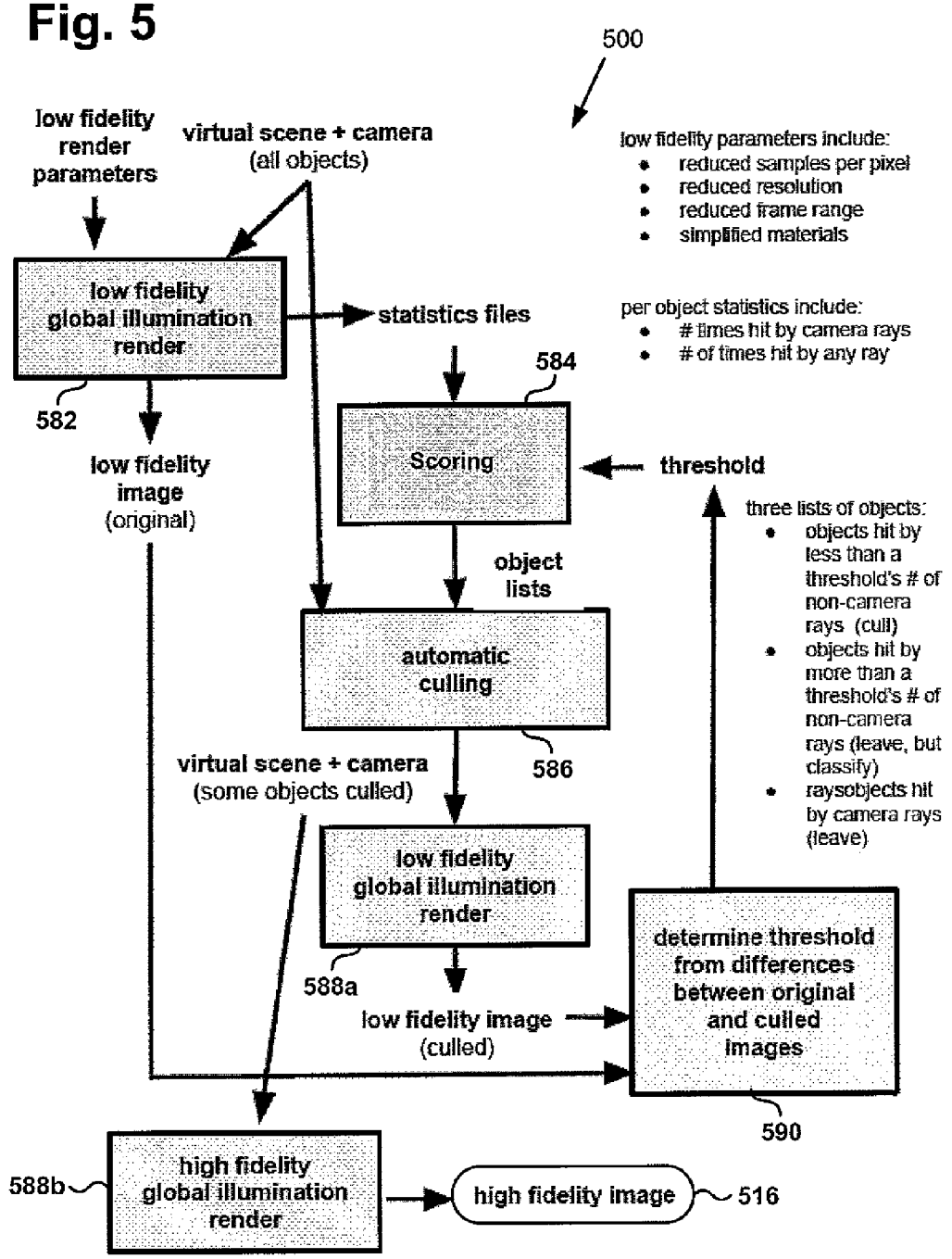

VIRTUAL OBJECT DISCRIMINATION FOR FAST GLOBAL ILLUMINATION RENDERING

RELATED APPLICATION(S)

The present application claims the benefit of and priority to Provisional Patent Application Ser. No. 62/165,829, filed May 22, 2015, and titled "Culling Unneeded Objects from Virtual Environments," which is hereby incorporated fully by reference into the present application.

BACKGROUND

Computer rendered graphics have come to play an important role in the production of a variety of entertainment content types. For example computer rendered graphics are regularly used to generate virtual environments for use in feature films and animation. These virtual environments can contain many individual geometric features, such as millions of individual features, and that number may grow as virtual environments continue to grow visually richer and more sophisticated. However, the very numerousness of the individual geometric features included in a virtual environment can undesirably slow the rendering of global illumination for that virtual environment. Moreover, in some instances, the computing resources required for representation of the virtual environment can exceed the memory storage capacity or processor throughput capability of a computing platform used to render the global illumination.

SUMMARY

There are provided methods and systems for performing virtual object discrimination for fast global illumination rendering, substantially as shown in and/or described in connection with at least one of the figures, and as set forth more completely in the claims.

BRIEF DESCRIPTION OF THE DRAWINGS

FIG. 5 is a diagram depicting virtual object discrimination for fast global illumination rendering using discrimination criteria set automatically by a global illumination system, according to one implementation.

DETAILED DESCRIPTION

Figure 1:
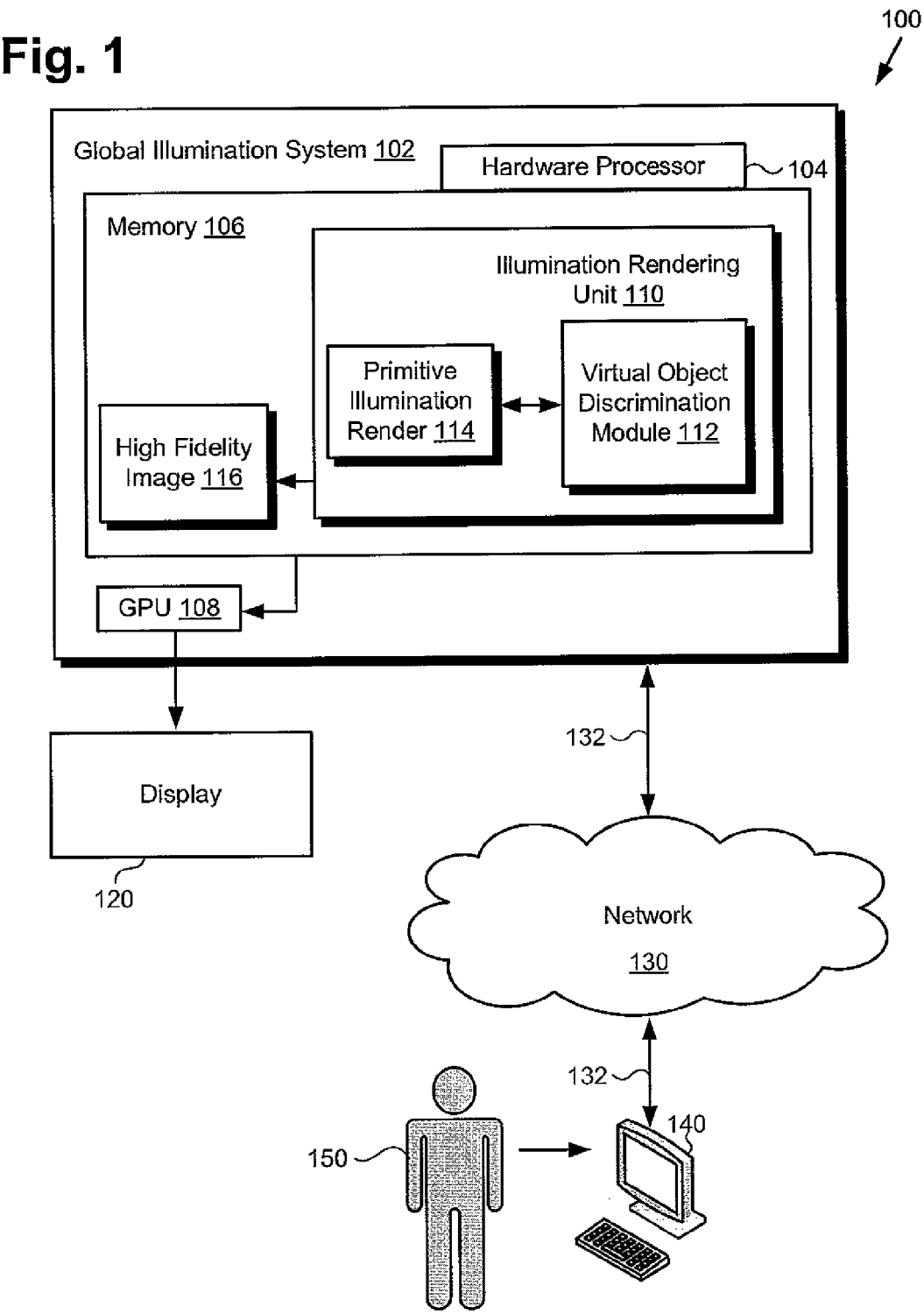
FIG. 1 shows a diagram of one exemplary implementation of a global illumination system configured to perform virtual object discrimination for fast global illumination rendering.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, the large number of individual geometric features included in a computer rendered virtual environment can undesirably slow the rendering of global illumination for that virtual environment. Moreover, in some instances, the computing resources required for representation of a virtual environment can exceed the memory storage capacity or processor throughput capability of a computing platform used to render global illumination for the virtual environment.

FIG. 1 shows a diagram of one exemplary implementation of a global illumination system configured to perform virtual object discrimination for fast global illumination rendering. As shown in FIG. 1, illumination rendering environment 100 includes global illumination system 102, communications network 130, display 120, workstation terminal 140, and artist or user 150 utilizing workstation terminal 140. As further shown in FIG. 1, global illumination system 102 includes hardware processor 104, graphics processing unit (GPU) 108, system memory 106 implemented as a non-transitory storage device for storing illumination rendering unit 110 including virtual object discrimination module 112 and primitive illumination render 114, as well as high fidelity image 116. Also shown in FIG. 1 are network communication links 132 interactively connecting workstation terminal 140 and global illumination system 102 via communications network 130.

It is noted that although FIG. 1 depicts illumination rendering unit 110 and high fidelity image 116 as being mutually co-located in memory 106, that representation is merely provided as an aid to conceptual clarity. More generally, global illumination system 102 may include one or more computing platforms, such as computer servers for example, which may be co-located, or may form an interactively linked but distributed system, such as a cloud based system, for instance. As a result, hardware processor 104 and memory 106 may correspond to distributed processor and memory resources within global illumination system 102. Thus, it is to be understood that illumination rendering unit 110 and high fidelity image 116 may be stored remotely from one another within the distributed memory resources of global illumination system 102. It is further noted that although FIG. 1 depicts high fidelity image 116 as residing in memory 106, in some implementations, high fidelity image 116, when completed, may be copied to non-volatile storage (not shown in FIG. 1).

According to the implementation shown by FIG. 1, user 150 may utilize workstation terminal 140 to interact with global illumination system 102, over communications network 130. In one such implementation, global illumination system 102 may correspond to one or more web servers, accessible over a packet network such as the Internet, for example. Alternatively, global illumination system 102 may correspond to one or more computer servers supporting a local area network (LAN), or included in another type of limited distribution network. Moreover, in some implementations, communications network 130 may be a high-speed network suitable for high performance computing (HPC), for example a 10 GigE network or an Infiniband network.

Although workstation terminal 140 is shown as a personal computer (PC) in FIG. 1, that representation is also provided merely as an example. In other implementations, workstation terminal 140 may be any other suitable mobile or stationary computing device or system. User 150 may use workstation terminal 140 to direct the operation of illumination rendering unit 110 including virtual object discrimination module 112, under the control of hardware processor 104.

Hardware processor 104 is configured to execute illumination rendering unit 110 in memory 106 to perform a first render of an illumination of a scene including multiple virtual objects, the first render being produced as primitive illumination render 114 of the scene. Hardware processor 104 is also configured to execute illumination rendering unit 110 to determine, using virtual object discrimination module 112, a score for each of the virtual objects in the scene, the score corresponding to the respective contribution by each virtual object to the illumination of the scene. Hardware processor 104 is further configured to execute illumination rendering unit 110 to identify, using virtual object discrimination module 112, one or more of the virtual objects that are disregardable based on their respective scores, and to perform a second render of the illumination of the scene while disregarding the presence of the identified one or more of virtual objects as disregardable in the scene. In one implementation, one or more of the virtual objects in the scene with a score less than a threshold score may be identified as one or more of virtual objects that can be disregarded. That is to say, the illumination rendering unit 110 is configured to discriminate amongst the virtual objects in the scene when performing the second render of the illumination of the scene.

In some implementations, the second render of the illumination of the scene may be another primitive render of the illumination of the scene, and may be utilized by virtual object discrimination module 112 to further refine rendering of the illumination of the scene. As used herein, the expression "primitive render" or "primitive illumination render" refers to an illumination of a scene performed using primitive or low fidelity render parameters. Such primitive or low fidelity render parameters may include one or more of reduced samples per pixel, reduced resolution, reduced frame range, and simplified material properties, for example.

With respect to reduced frame range, if an average representation of a scene has approximately seventy (70) frames defining a frame range, for example, not all 70 frames need be utilized to produce primitive illumination render 114. Instead, primitive illumination render 114 may be performed by illumination rendering unit 110 through sampling of every two to three frames within the frame range. Regarding simplified material properties, where ray tracing is used to generate the data for rendering the illumination of the scene, certain results of the interactions between rays and virtual objects within the scene may not be fully determined. For example, in some implementations, utilizing simplified material properties may correspond to omission of calculations necessary to determine a color or shade produced by interaction of a ray with a virtual object surface.

In some implementations, the second render performed by illumination rendering unit 110 may be a less primitive render than primitive illumination render 114. That is to say, in those implementations, the second render may be performed utilizing less primitive or mid-fidelity render parameters. Such mid-fidelity render parameters may include one or more of increased samples per pixel, increased resolution, increased frame range, and less simplified material properties, compared to the primitive render parameters used to perform primitive illumination render 114.

In other implementations, the second render performed by illumination rendering unit 110 may be a high fidelity render producing high fidelity image 116 as a final illumination of the scene. In those latter implementations, high fidelity image 116 may be output to display 120 through GPU 108.

It is noted that, in some implementations, hardware processor 104 is configured to execute illumination rendering unit 110 to utilize virtual object discrimination module 112 to identify other virtual objects within the scene each having a score greater than the threshold score but less than another, higher threshold score, as well as yet other virtual objects each having a score greater than the higher threshold score. In those implementations, hardware processor 104 may be configured to execute illumination rendering unit 110 to perform the second render of the illumination of the scene while allocating more processing resources to the virtual objects having a score greater than the higher threshold score than to the virtual objects having a score less than the higher threshold score but greater than the lower threshold score.

In other words, in those implementations, the virtual objects present within the scene are weighted based on their respective contribution to the illumination of the scene. As a result of that weighting, some virtual objects are disregarded during performance of a high fidelity render of the illumination of the scene. Moreover, the processing resources used to perform the high fidelity render of the illumination of the scene are allocated among the remaining virtual objects based on their respective contributions to that illumination, as indicated by their respective scores.

Thus, global illumination system 102 can utilize illumination rendering unit 110 to perform a high fidelity render of the illumination of a scene to produce high fidelity image 116 despite disregarding some virtual objects and reducing the processing resources allocated to others. As a result, high fidelity image 116 can advantageously be produced more quickly than is possible using conventional solutions in which substantially all virtual objects may be included and equally weighted in the process of rendering the illumination of the scene. Moreover, high fidelity image 116 can advantageously be produced even in instances in which the number of individual geometric features introduced by the virtual objects present in the scene would otherwise result in a computational overhead exceeding the processing and/or memory resources of global illumination system 102.

Figure 2:
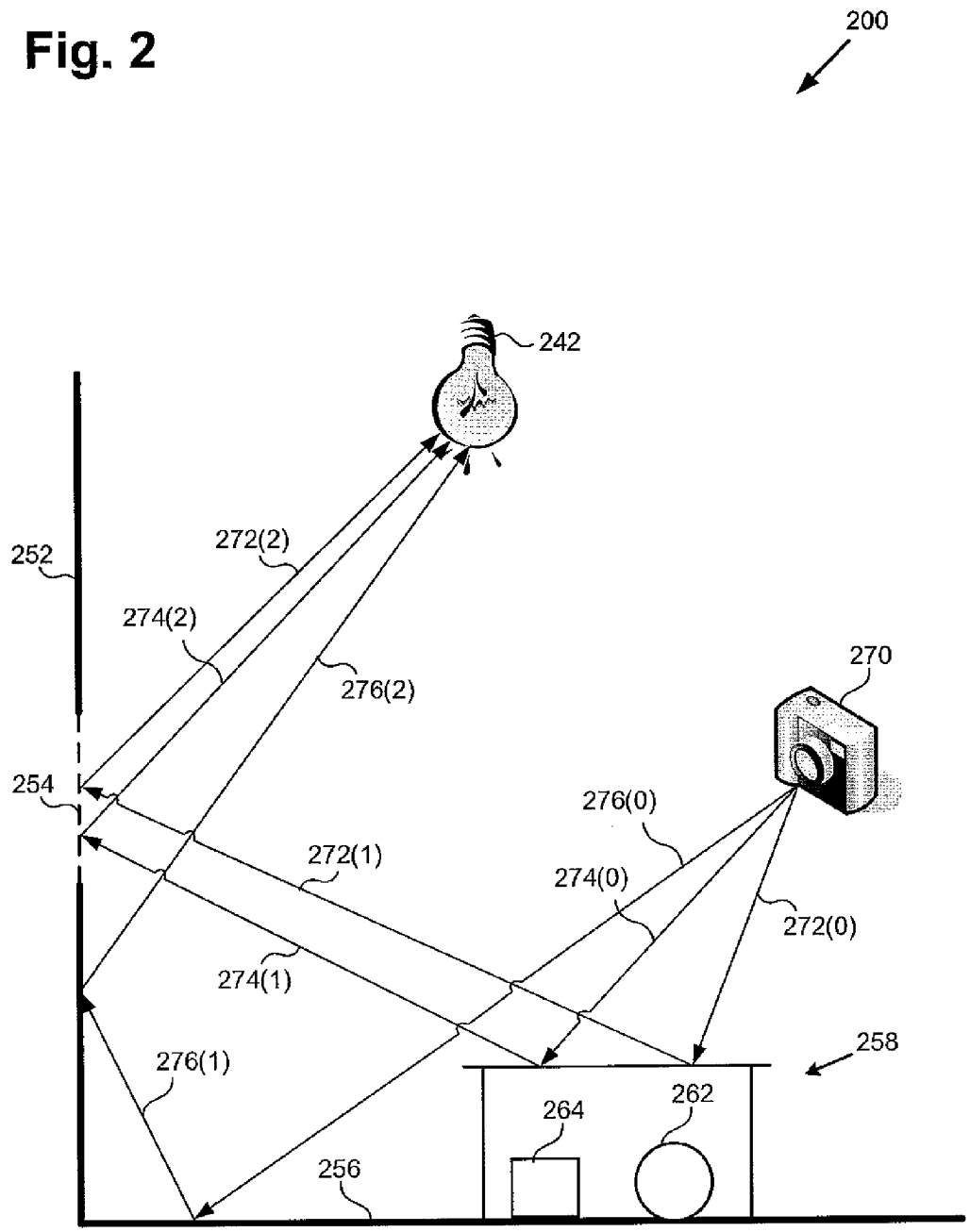
FIG. 2 shows a diagram of a virtual environment depicting interactions of rays utilized in a global illumination process with virtual objects within the virtual environment, according to one implementation.

Continuing to FIG. 2, FIG. 2 shows a diagram of a virtual environment depicting interactions of rays utilized in a global illumination process with virtual objects within the virtual environment, according to one implementation. Virtual environment or scene 200 (hereinafter "scene 200") includes light source 242, as well as virtual objects 252, 254, 256, 258, 262, and 264, represented respectively as wall 252, window 254 in wall 252, floor 256, table 258, and occluded virtual objects 262 and 264.

Scene 200 also includes rays 272(0), 272(1), 272(2), 274(0), 274(1), 274(2), 276(0), 276(1), and 276(2) forming respective ray paths between light perspective camera 270 and light source 242. That is to say, rays 272(0), 272(1), and 272(2), together, form a ray path between perspective camera 270 and light source 242. Analogously, rays 274(0), 274(1), and 274(2) combine to form another ray path, while rays 276(0), 276(1), and 276(2) combine to form yet another ray path between perspective camera 270 and light source 242.

Each of rays 272(0), 272(1), 272(2), 274(0), 274(1), 274(2), 276(0), 276(1), and 276(2) has an origin and a destination, either or both of which may be a point of intersection with an individual geometric feature, such as a surface, provided by a virtual object in scene 200, e.g., a surface provided by one of virtual objects 252, 254, 256, or 258. It is noted that the parenthetical (0) denotes a ray depth of zero corresponding to a ray that has not experienced a previous scattering event (referred to herein as a "camera ray"), while the parentheticals (1) and (2) denote respective ray depths of one and two and correspond respectively to rays that have experienced first and second scattering events (referred to herein as "non-camera rays"). It is further noted that virtual objects 262 and 264 are referred to as occluded virtual objects because neither of occluded virtual objects 262 or 264 has a surface intersected by a ray, i.e., rays 272(0), 272(1), 272(2), 274(0), 274(1), 274(2), 276(0), 276(1), and 276(2), contributing to the illumination of scene 200.

Although rays 272(0), 272(1), 272(2), 274(0), 274(1), 274(2), 276(0), 276(1), and 276(2) are shown as defining camera paths from perspective camera 270 to light source 242, that representation is shown for conceptual clarity. In other implementations, the concepts discussed herein by reference to FIG. 2 may be implemented bi-directionally, without regard to the direction of rays 272(0), 272(1), 272(2), 274(0), 274(1), 274(2), 276(0), 276(1), and 276(2). That is to say, substantially the same or complementary illumination of scene 200 results when the rays shown in FIG. 2 have their directions of propagation reversed.

Figure 3:
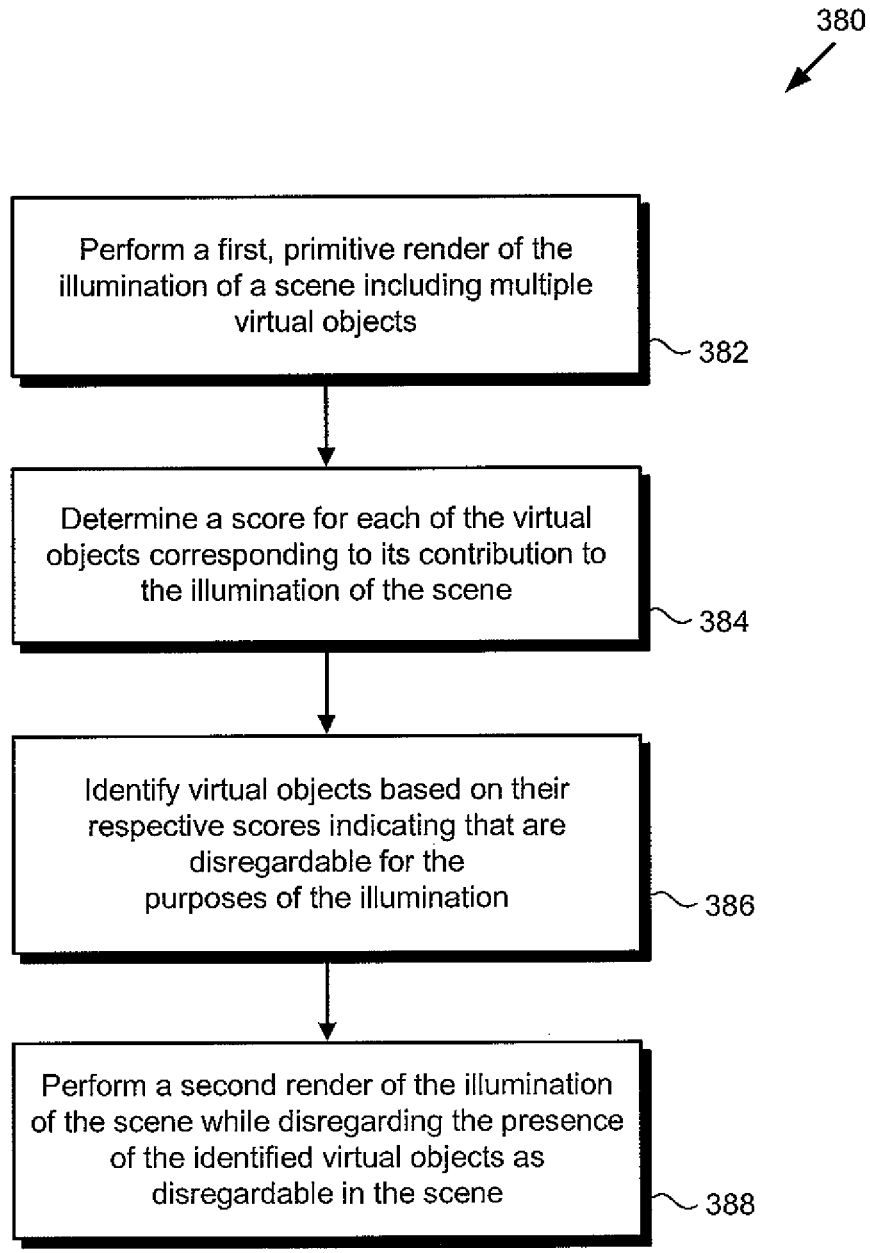
FIG. 3 is a flowchart presenting an exemplary method for performing virtual object discrimination for fast global illumination rendering.
Figure 4:
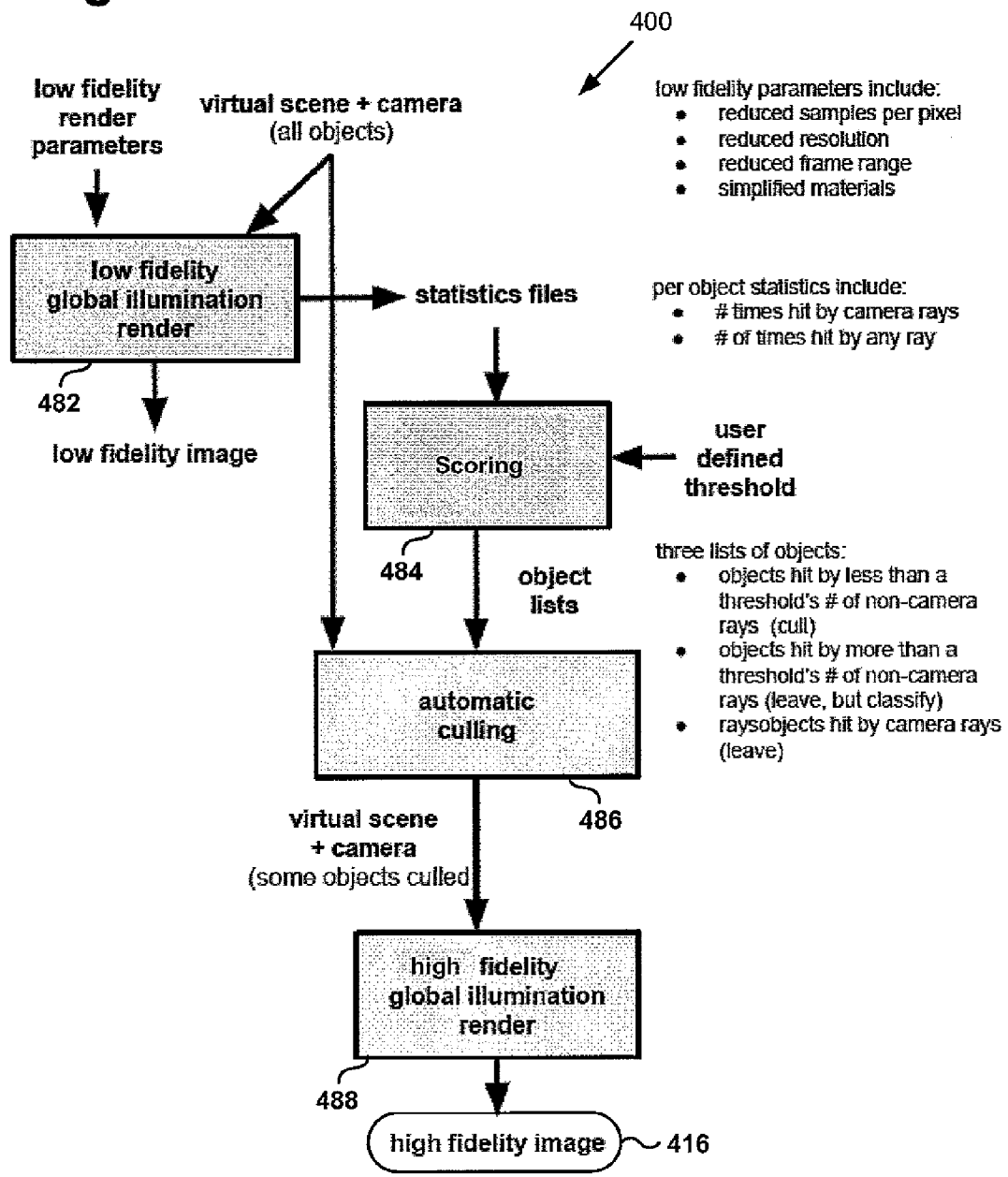
FIG. 4 is a diagram depicting virtual object discrimination for fast global illumination rendering using discrimination criteria set by a user of a global illumination system, according to one implementation.

FIGS. 1 and 2 will be further described by reference to FIG. 3 in combination with FIGS. 4 and 5. FIG. 3 shows flowchart 380 presenting an exemplary method for performing virtual object discrimination for fast global illumination rendering. FIG. 4 shows diagram 400 depicting virtual object discrimination using discrimination criteria set by a user of a global illumination system, while FIG. 5 shows diagram 500 depicting virtual object discrimination using discrimination criteria set automatically by the global illumination system, according to respective exemplary implementations.

Flowchart 380 begins with performing a first render of an illumination of scene 200 including virtual objects 252, 254, 256, 258, 262, and 264, the first render being primitive illumination render 114 of the illumination of scene 200 (action 382).

Primitive illumination render 114 may be performed by illumination rendering unit 110 of global illumination system 102, executed by hardware processor 104. Performance of primitive illumination render 114 corresponds to low fidelity global illumination render blocks 482 and 582 in respective FIGS. 4 and 5.

As discussed above, the expression "primitive render" or "primitive illumination render" refers to an illumination of scene 200 performed using primitive or low fidelity render parameters. Moreover, and as further discussed above, such primitive or low fidelity render parameters may include one or more of reduced samples per pixel, reduced resolution, reduced frame range, and simplified material properties. For example, use of simplified material properties may correspond to omission of calculations necessary to determine a color or shade produced by intersection of rays 272(0), 272(1), 272(2), 274(0), 274(1), 274(2), 276(0), 276(1), and 276(2) with surfaces provided by virtual objects 252, 254, 256, and 258.

Flowchart 380 continues with determining a score for each of virtual objects 252, 254, 256, 258, 262, and 264 corresponding to its respective contribution to the illumination of scene 200 (action 384). Determination of the score for each of virtual objects 252, 254, 256, 258, 262, and 264 may be performed by illumination rendering unit 110, executed by hardware processor 104, and using virtual object discrimination module 112. Determination of the score for each of virtual objects 252, 254, 256, 258, 262, and 264 corresponds to scoring blocks 484 and 584 in respective FIGS. 4 and 5.

Scoring for each of virtual objects 252, 254, 256, 258, 262, and 264 may be based on per virtual object statistics gathered by virtual object discrimination module 112, based on primitive illumination render 114. For example scoring of a virtual object may be increased according to the number of camera ray intersections experienced by the virtual object, as well as by the number of non-camera ray intersections experienced by the virtual object. Moreover, the ray depth at the point of intersection with the virtual object may further serve as a per object statistic for determining its score.

For example, virtual object 258 may be determined to have a relatively high score due to its intersections by camera rays 272(0) and 274(0), as well as its intersections with non-camera rays 272(1) and 274(1) each having a ray depth of (1). By contrast, occluded virtual objects 262 and 264 may be determined to have relatively low scores due to the absence of an intersection of occluded virtual objects 262 and 264 by either a camera ray or a non-camera ray. In other words virtual object 258 may be determined to have a high score corresponding to a significant contribution to illumination of scene 200, while each of occluded virtual objects 262 and 264 may be determined to have a low score corresponding to its respectively negligible or disregardable contribution to illumination of scene 200.

Flowchart 380 continues with identifying one or more of virtual objects 252, 254, 256, 258, 262, and 264 based on their respective scores indicating that they are disregardable for the purposes of the illumination (action 386). According to the present exemplary implementation, the threshold score serves as a discrimination criterion for discriminating among virtual objects 252, 254, 256, 258, 262, and 264 with respect to rendering illumination of scene 200. In one implementation, identification of one or more of virtual objects 252, 254, 256, 258, 262, and 264 each having a score less than the threshold score may be performed by illumination rendering unit 110, executed by hardware processor 104, and using virtual object to discrimination module 112. Identification of one or more of virtual objects 252, 254, 256, 258, 262, and 264 each having a score less than the threshold score corresponds to automatic culling blocks 486 and 586 in respective FIGS. 4 and 5.

The threshold score serves to enable identification of virtual objects that may be culled from scene 200 without substantially affecting the rendered illumination of scene 200. In other words, the virtual objects having a score less than the threshold score may be considered disregardable for the purposes of illuminating the scene in which they are present. For example, due to the absence of an intersection of occluded virtual objects 262 and 264 by any ray (camera ray or non-camera ray) in scene 200, occluded virtual objects 262 and 264 may be culled from scene 200 for the purposes of rendering its illumination.

In some implementations, the threshold score may be a predetermined threshold score included in virtual object discrimination module 112 as a preliminary default threshold. In some implementations, the threshold score may be set by user 150 of global illumination system 102. Moreover, and as will be further discussed below by reference to FIG.

5, in some implementations, the threshold score can be changed automatically by global illumination system 102.

Exemplary flowchart 380 may conclude with performing a second render of the illumination of scene 200 while disregarding the presence of the identified one or more of virtual objects 252, 254, 256, 258, 262, and 264 that are disregardable in scene 200 (action 388). The second render of the illumination of scene 200 may be performed by illumination rendering unit 110, executed by hardware processor 104. Performance of the second render of the illumination of scene 200 can correspond to either high fidelity global illumination render block 488, in FIG. 4, or low fidelity global illumination render block 588a in FIG. 5.

As noted above by reference to FIG. 2, due to the absence of an intersection of occluded virtual objects 262 and 264 by any ray in scene 200, occluded virtual objects 262 and 264 may have a score less than the threshold score and thus may be culled from scene 200 for the purposes of rendering illumination of scene 200. As a result, occluded virtual objects 262 and 264 may be disregarded during performance of the second render.

Referring to FIG. 4 in combination with FIG. 1 and FIG. 2, in some implementations, the second render may be a final high fidelity render of the illumination of scene 200, resulting in production of high fidelity image 416 of the illumination of scene 200. It is noted that high fidelity image 416 corresponds to high fidelity image 116, in FIG. 1, and may share any of the characteristics attributed to that corresponding feature, above.

In other implementations, the second render performed by illumination rendering unit 110 may be another primitive render, performed using substantially the same primitive or low fidelity render parameters utilized to perform primitive illumination render 114. In other implementations, the second render, while not a high fidelity render, may be a less primitive render than primitive illumination render 114. That is to say, in those implementations, the second render may be performed using less primitive or mid-fidelity render parameters. Such mid-fidelity render parameters may include one or more of increased samples per pixel, increased resolution, increased frame range, and less simplified material properties, compared to the primitive render parameters used to perform primitive illumination render 114.

Referring to FIG. 5, in implementations in which the second render is a low fidelity, primitive render as represented by low fidelity global illumination render block 588a, the present method may further include comparing the second render of the illumination of scene 200 to the first render of the illumination of scene 200, i.e., to primitive illumination render 114. Comparison of the second render to primitive illumination render 114 may be performed by illumination rendering unit 110, executed by hardware processor 104.

As noted above, in some implementations, global illumination system 102 may be configured to change the threshold score automatically. In one such implementation, for example, a predetermined threshold score provided as a preliminary default threshold score may be changed automatically by global illumination system 102 based on the comparison of the second render to primitive illumination render 114. Determination of an appropriate threshold score for use by virtual object discrimination module 112 corresponds to block 590, in FIG. 5. It is noted that the process represented by block 590 may be repeated, such that the threshold score is adaptively changed to reduce the differences between subsequent low fidelity renders and original low fidelity primitive illumination render 114.

Ultimately, an appropriate threshold score is determined, and a high fidelity render corresponding to high fidelity global illumination render block 588b may be performed to produce high fidelity image 516. High fidelity image 516 corresponds to high fidelity image 116, in FIG. 1, and may share any of the characteristics attributed to that corresponding feature, above.

According to some implementations, the present method may include use of more than one threshold score to discriminate among the virtual objects in scene 200. For example, in some implementations, hardware processor 104 may be configured to execute illumination rendering unit 110 to utilize virtual object discrimination module 112 to identify other virtual objects from among virtual objects 252, 254, 256, and 258 each having a score greater than the threshold score but less than another, higher threshold score, as well as yet others of virtual objects 252, 254, 256, and 258 each having a score greater than the higher threshold score. It is noted that the higher threshold score may be set by user 150, may be predetermined, or may be set automatically by global illumination system 102.

In implementations in which both a threshold score and a higher threshold score are used, the final, high fidelity render of the illumination of scene 200 may be performed while allocating more processing resources to the virtual objects having a score greater than the higher threshold score than to the virtual objects having a score less than the higher threshold score but greater than the lower threshold score. Consequently, virtual objects 252, 254, 256, 258, 262, and 264 present within scene 200 may be weighted based on their respective contribution to the illumination of scene 200. As a result of that weighting, some virtual objects (e.g., occluded virtual objects 262 and 264) may be disregarded during performance of a high fidelity render producing high fidelity image 116/416/516. Moreover, the processing resources used to perform the high fidelity render of the illumination of scene 200 may be allocated among the remaining virtual objects (e.g., virtual objects 252, 254, 256, and 258) based on their respective contributions to that illumination, as indicated by their respective scores.

Thus, the global illumination systems and methods disclosed in the present application enable performance of high fidelity rendering of the illumination of a scene while disregarding some virtual objects present in the scene and/or reducing the processing resources allocated to others. As a result, a high fidelity image of the illumination of the scene can advantageously be produced more quickly than is possible using conventional solutions for performing global illumination. Moreover, such a high fidelity image can advantageously be produced even in instances in which the number of individual geometric features introduced by the virtual objects present in the scene would otherwise result in a computational overhead exceeding the processing and/or memory resources of the global illumination systems disclosed herein.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A global illumination system comprising:
a hardware processor and a memory;
an illumination rendering unit including a virtual object discrimination module stored in the memory, wherein the hardware processor is configured to execute the illumination rendering unit to:
perform a first render of an illumination of a scene including a plurality of virtual objects, the first render being a primitive render of the illumination of the scene;
determine, using the virtual object discrimination module, a score for each of the plurality of virtual objects corresponding to its respective contribution to the illumination of the scene;
identify, using the virtual object discrimination module, one or more of the plurality of virtual objects as disregardable based on comparing each of the scores with a first threshold score;
perform a second render of the illumination of the scene while culling from the scene the identified one or more of the plurality of virtual objects as disregardable in the scene;
compare, using the virtual object discrimination module, the second render of the illumination of the scene to the first render of the illumination of the scene; and
automatically change the first threshold score based on comparing.

2. The global illumination system of claim 1, wherein the second render is another primitive render of the illumination of the scene.

3. The global illumination system of claim 1, wherein the second render provides a lower fidelity render of the illumination of the scene than the first render.

4. The global illumination system of claim 1, wherein the second render provides a higher fidelity render of the illumination of the scene than the first render.

5. A global illumination system comprising:
a hardware processor and a memory;
an illumination rendering unit including a virtual object discrimination module stored in the memory, wherein the hardware processor is configured to execute the illumination rendering unit to:
perform a first render of an illumination of a scene including a plurality of virtual objects, the first render being a primitive render of the illumination of the scene;
determine, using the virtual object discrimination module, a score for each of the plurality of virtual objects corresponding to its respective contribution to the illumination of the scene;
identify, using the virtual object discrimination module, one or more of the plurality of virtual objects as disregardable based on comparing each of the scores with a first threshold score;
identify, using the virtual object discrimination module, second one or more of the plurality of virtual objects each having a score greater than the first threshold score but less than a second threshold score, and third one or more of the plurality of virtual objects each having a score greater than the second threshold score; and
perform a second render of the illumination of the scene while culling from the scene the identified one or more of the plurality of virtual objects as disregardable in the scene.

6. The global illumination system of claim 5, wherein the hardware processor is configured to execute the illumination rendering unit to perform the second render of the illumination of the scene while allocating more processing resources to the third one or more of the plurality of virtual objects than to the second one or more of the plurality of virtual objects.

7. A method for use by a global illumination system including a hardware processor and a memory having stored therein an illumination rendering unit including a virtual object discrimination module, the method comprising:
performing a first render of an illumination of a scene including a plurality of virtual objects, the first render being a primitive render of the illumination of the scene;
determining, using the virtual object discrimination module, a score for each of the plurality of virtual objects corresponding to its respective contribution to the illumination of the scene;
identifying, using the virtual object discrimination module, one or more of the plurality of virtual objects as disregardable based on comparing each of the scores with a first threshold score;
performing a second render of the illumination of the scene while culling from the scene the identified one or more of the plurality of virtual objects as disregardable in the scene;
comparing, using the virtual object discrimination module, the second render of the illumination of the scene to the first render of the illumination of the scene; and
automatically changing the first threshold score based on comparing.

8. The method of claim 7, wherein the second render is another primitive render of the illumination of the scene.

9. The method of claim 7, wherein the second render provides a lower fidelity render of the illumination of the scene than the first render.

10. The method of claim 7, wherein the second render provides a higher fidelity render of the illumination of the scene than the first render.

11. A method for use by a global illumination system including a hardware processor and a memory having stored therein an illumination rendering unit including a virtual object discrimination module the method comprising:
performing a first render of an illumination of a scene including a plurality of virtual objects, the first render being a primitive render of the illumination of the scene;
determining, using the virtual object discrimination module, a score for each of the plurality of virtual objects corresponding to its respective contribution to the illumination of the scene;
identifying, using the virtual object discrimination module, one or more of the plurality of virtual objects as disregardable based on comparing each of the scores with a first threshold score;
identifying, using the virtual object discrimination module, second one or more of the plurality of virtual objects each having a score greater than the first threshold score but less than a second threshold score, and third one or more of the plurality of virtual objects each having a score greater than the second threshold score; and performing a second render of the illumination of the scene while culling from the scene the identified one or more of the plurality of virtual objects as disregardable in the scene.

12. The method of claim 11, wherein performing the second render of the illumination of the scene comprises performing the second render while allocating more processing resources to the third one or more of the plurality of virtual objects than to the second one or more of the plurality of virtual objects.

* * * * *